United States Patent [19]

Colmon et al.

[11] 4,327,634
[45] May 4, 1982

[54] APPARATUS FOR ASSEMBLING SHEETS OF GLASS AND/OR PLASTIC MATERIALS

[75] Inventors: Daniel Colmon; Francis Triffaux, both of Thourotte, France

[73] Assignee: Saint-Gobain Vitrage, Neuilly-sur-Seine, France

[21] Appl. No.: 123,350

[22] Filed: Feb. 21, 1980

[30] Foreign Application Priority Data

Feb. 21, 1979 [FR] France ............... 79 04337

[51] Int. Cl.³ .............................................. B30B 3/04
[52] U.S. Cl. .............................. 100/155 G; 100/160; 100/162 B; 100/170; 156/582
[58] Field of Search ......... 100/93 RP, 155 R, 155 G, 100/160, 162, 163 R, 163 A, 168, 169, 170, 176, 162 B, 211; 156/582, 583.91, 102, 106; 29/113 R, 113 AD, 116 R, 116 AD; 26/101–104; 68/244, 256

[56] References Cited

U.S. PATENT DOCUMENTS

| 2,163,648 | 6/1939 | Watkins et al. | 100/93 RP |
| 2,685,548 | 8/1954 | Drozdowski | 100/155 G |
| 2,828,654 | 4/1958 | Ungerer | 100/160 X |
| 2,851,869 | 9/1958 | Quoos et al. | 100/162 B |
| 2,983,635 | 5/1961 | Richardson | 100/155 G |
| 2,997,406 | 8/1961 | Freeman et al. | 100/160 |
| 3,054,344 | 9/1962 | Boicey et al. | 156/582 X |
| 3,146,160 | 8/1964 | Kankaapaa | 100/162 B |
| 3,383,884 | 5/1968 | Meyer | 68/256 |
| 3,543,365 | 12/1970 | Helminen | 29/113 R |
| 3,572,570 | 3/1971 | Mortensen | 100/170 |
| 3,669,808 | 6/1972 | Klotzbach | 100/155 G |

FOREIGN PATENT DOCUMENTS 1197090 1/1958 France .
2053104 7/1970 France .

Primary Examiner—Peter Feldman
Attorney, Agent, or Firm—John T. Synnestvedt; Richard D. Weber

[57] ABSTRACT

The object of the invention is an apparatus for the preliminary or final assembly of sheets of glass and/or plastic material for forming laminated glazings.

The apparatus according to the invention comprises a lower pinching means following a curvature transversal to the bottom side of the rigid support of the glazing, a flexible, cylindrical pressure roller placed above the lower pinching means, means bearing on the pressure roller to give it the desired curvature, and means providing a rotational drive of the pressure roller and/or the lower pinching means.

The invention is applicable to the manufacture of laminated glazings, particularly for automobile glazings or flat glass used in construction.

26 Claims, 7 Drawing Figures

APPARATUS FOR ASSEMBLING SHEETS OF GLASS AND/OR PLASTIC MATERIALS

BACKGROUND OF THE INVENTION

The present invention relates to the assembly of sheets of glass and/or plastic materials for forming a laminated glazing. More particularly, the invention concerns the assembly of the aforesaid elements by calendering; that is to say by passing these elements between pinching rollers.

Further still, the invention relates to an apparatus for assembling a substrate, which can be either flat, or of simple or double curvature, which is monolithic or laminated, of glass or of plastic material, with a sheet or film of plastic material, for forming a safety glazing.

Although the invention may be utilized for the manufacture of a wide variety of laminated glazings, it will be described more particularly hereinafter in relation to the manufacture of a laminated safety glazing comprising a rigid, monolithic or laminated substrate, covered with a flexible sheet of plastic material, conferring the desired safety features. Such a glazing is, for example, described in French Pat. Nos. 2,187,719 and 2,251,608 and in Belgian Pat. No. 856,398.

The assembly of these laminated glazings is generally carried out by a preliminary pressing of the elements, by calendering, and if need be, followed by an autoclave cycle to improve the adherence between the elements of the laminate.

When the laminated glazing is flat, or when it has a simple curvature, the calendering can be done by passing the elements to be assembled between two cylindrical rollers covered with a suitable elastic material or even between two enlargeable rollers made of rubber. This operation generally poses no problems since it is easy in these two cases to apply uniform pressure on the entire surface of the assembled elements of the glazing.

On the other hand, when the laminated glazing has a double curvature, it becomes very difficult to obtain a homogeneous assembly of the elements over their entire surface.

There is a known apparatus with pressure rollers in which the rollers are equipped, on a length corresponding at least to the width of the sheets to be pressed, with a covering of an elastic material such as rubber, the inner space of this flexible covering being filled with a fluid under pressure. In such an apparatus, the roller acting on the concave side of the glazing takes on during operation the shape of a cigar following the transversal curvature of the glazing. Thereby, the linear speed at the periphery of the covering varies from point to point. Creases can therefore form on the sheet or film of plastic material applied by this roller to the substrate.

Another known apparatus exists in which the rollers are replaced by two superposed sets of wheels placed side by side, each of their positions being regulated independent of the other, to obtain the desired transversal curvature. Although this apparatus may be suited for the manufacture of a laminated glazing wherein the two outer sides are made of rigid elements, such as two sheets of glass, it is not adapted for the assembly of a flexible sheet with a rigid substrate, since it cannot provide a homogeneous adherence of such elements due to the formation of numerous air bubbles in the grooves corresponding to the spaces between two adjacent wheels acting against the flexible sheet.

SUMMARY OF THE INVENTION

The present invention provides an apparatus which prevents the cited disadvantages and which is particularly adapted for the preliminary or final assembly of the glazings mentioned hereabove, comprising a monolithic or laminated substrate, of glass or of plastic material, coated with a sheet or film of flexible plastic material.

The apparatus of the invention provides an assembly of a glazing of which the elements adhere homogeneously to each other over their entire surface. Furthermore, the adhesion provided is usually sufficient to permit use of the glazing without the need for an autoclave cycle. Finally, this apparatus produces a glazing of very good optical quality, free of bubbles.

In accordance with the invention, the apparatus for the manufacture of laminated glazings comprises: lower pinching means extending transversely to the direction of movement of the glazing to be assembled and having a curvature conforming to the curvature of the bottom side of the glazing, a flexible cylindrical pressure roller placed above the lower pinching means and having a length at least equal to the width of the elements to be assembled, that is to say at least equal to the transverse dimension of the elements to be assembled with regard to their direction of movement; means bearing on the pressure roller to give it the desired curvature, namely that of the curvature of the top side of the glazing to be assembled considered transversely to its direction of movement, which latter means keeps the roller in its operational position preferably at a distance from the lower pinching means slightly less than the total thickness of the elements to be assembled, and means providing a rotational drive of the pressure roller and/or part of all of the lower pinching means.

The apparatus, which may for example be used for the manufacture of a laminated automobile glazing or of flat glass used in construction wherein the two outer sides are parallel, has lower pinching means and a pressure roller adapted to produce practically identical curvatures, said curvatures being close to the average curve of the glazing to be assembled considered transversely to its direction of movement.

The lower pinching means, following approximately the curvature of the lower surface of the substrate, preferably comprises a series of lower wheels, each one equipped with a means for regulating its position in the apparatus. The apparatus is therefore adapted to the most diverse curvatures and can effect the manufacture of many types of laminated glazings. Preferably, all the lower wheels have the same diameter and have, in addition, an elastic layer on their periphery. In one embodiment of the invention, these lower wheels are of two kinds: motorized wheels entraining the glazing at the time of assembly and freeturning wheels entrained by the movement of the glazing.

Because of the longitudinal curvature of the glazing, its thickness and its placement in the apparatus, the length of the glazing on its bottom side is greater than that of its top side. To avoid all risks of distortion of the glazing by rotation and/or movement perpendicular to its forward motion, the pressure roller is preferably motorized and the motorized lower wheels are provided with drive means which, if need be, enable them to rotate at a greater speed than that provided by their driving motor.

The flexible, cylindrical pressure roller, curved by the means bearing thereon from above, is applied against the upper element to be assembled, such as a flexible and soft sheet of plastic material for pressing it against a lower rigid glasing portion or substrate. This roller must be sufficiently flexible to take on the curvature of the glazing, this curvature being either uniform or, as in most cases, irregular. At the same time, the outer surface of the roller must preferably be hard enough to be resistant to wear.

The pressure roller should be long enough to avoid any deforming effects on the glazing edges. Its diameter should be relatively small, generally less than 15 to 20 cm; it is preferably on the order of 10 cm or less, so that it acts on a narrow area of the glazing.

The pressure roller can for example be made of vulcanized rubber. Preferably it is made from at least two layers of rubber of different hardnesses: a hard outer layer and a softer inner layer. In this way, the flexibility of the system is increased to more readily accommodate changes in the glazing curvature.

The pressure roller may also be made from other synthetic materials of adequate flexibility, such as polyurethane, polyethylene, etc ... The pressure roller can also comprise a hard inner layer serving as a reinforcement preventing excessive pinching of the roller when the roller is raised, as will be described below.

In a preferred form, the pressure roller is made up of three layers: a hard outer layer made of vulcanized rubber having a good resistance to abrasion and wear, a soft intermediate layer made of vulcanized rubber providing great flexibility, and a hard inner layer constituting the core of the roller made of vulcanized rubber, and which provides sufficient rigidity to prevent excessive pinching caused by its own weight when it is raised by its extremities.

For pressing laminated glazings with a uniform cylindrical transverse curvature, the pressure roller can possibly have a metallic core of sufficiently small diameter, for example, on the order of 10 to 15 millimeters.

On the other hand, when the laminated glazing has an irregular, transverse, curvature, a pressure roller with a metallic core would have difficulty in following this irregular curvature; a roller made entirely from rubber or from other flexible materials is thus preferably utilized.

The pressure roller is preferably connected to a motorized drive system which can be the same as the system driving the lower motorized wheels.

The means bearing on the cylindrical pressure roller to give it the desired curvature preferably comprises a series of roller bending wheels, each of them being equipped with means for independently regulating their height.

In one embodiment of the apparatus, some of these roller bending wheels press upstream on the upper periphery of the pressure roller, while others press downstream on its upper periphery. The maintaining of the pressure roller in its operating position is thus assured by preventing it from shifting too much from the engagement with the glazing during assembly.

According to another advantageous embodiment of the invention, the maintenance of the flexible, cylindrical pressure roller in its operating position is achieved by means independent of the roller bending wheels, the independent means pressing on the downstream side of its upper periphery, while the wheels effecting the roller curvature are shifted slightly upstream above the roller. The independent means which press on the downstream side of the pressure roller and which prevent it from shifting in this direction can be formed by two wheels, a series of wheels or by a single support roller adjustable in height and in position with regard to the pressure roller.

Advantageously, the roller bending wheels can each be mounted on a spring movement and flexible return system, such as a return spring or a jack. In this way, the curvature of the roller can evolve more easily during assembly, in order to adapt at each moment to the exact transverse curvature of the glazing.

While manufacturing laminated glazings having a rigid substrate of glass, monolithic or laminated, to avoid breakage it is important that this substrate be supported correctly by the lower wheels during the entire assembly operation, particularly those wheels acting on the edges. This is why these lower wheels can comprise a flexible layer and/or they can be mounted like the roller bending wheels on a spring movement and flexible return system, such as a return spring or a jack.

The jacks can be set in motion during the assembly operation so as to follow the changes in the transverse curvature of the glazing. The action of hydraulic or hydropneumatic jacks can be programmed in advance.

The position of the roller bending and/or lower wheels could even be adjusted during the pressing operation by utilizing mechanical means such as cams.

The pressing means of the apparatus can be mobile around a horizontal axis so that, when the edge of the rigid portion of the glazing reaches the pressing means, the glazing is practically perpendicular to the plane passing through the geometrical axis of the pressure roller and the lower wheels.

The apparatus can be utilized for assembling rigid or flexible elements previously placed one on top of the other. It can also be utilized for assembling a monolithic or laminated rigid substrate with a flexible sheet not previously superposed.

Other characteristics and advantages of the apparatus will be apparent from the following description of a preferred embodiment of the invention made with reference to the drawings.

DESCRIPTION OF THE PREFERRED EMBODIMENT

Figure 1:
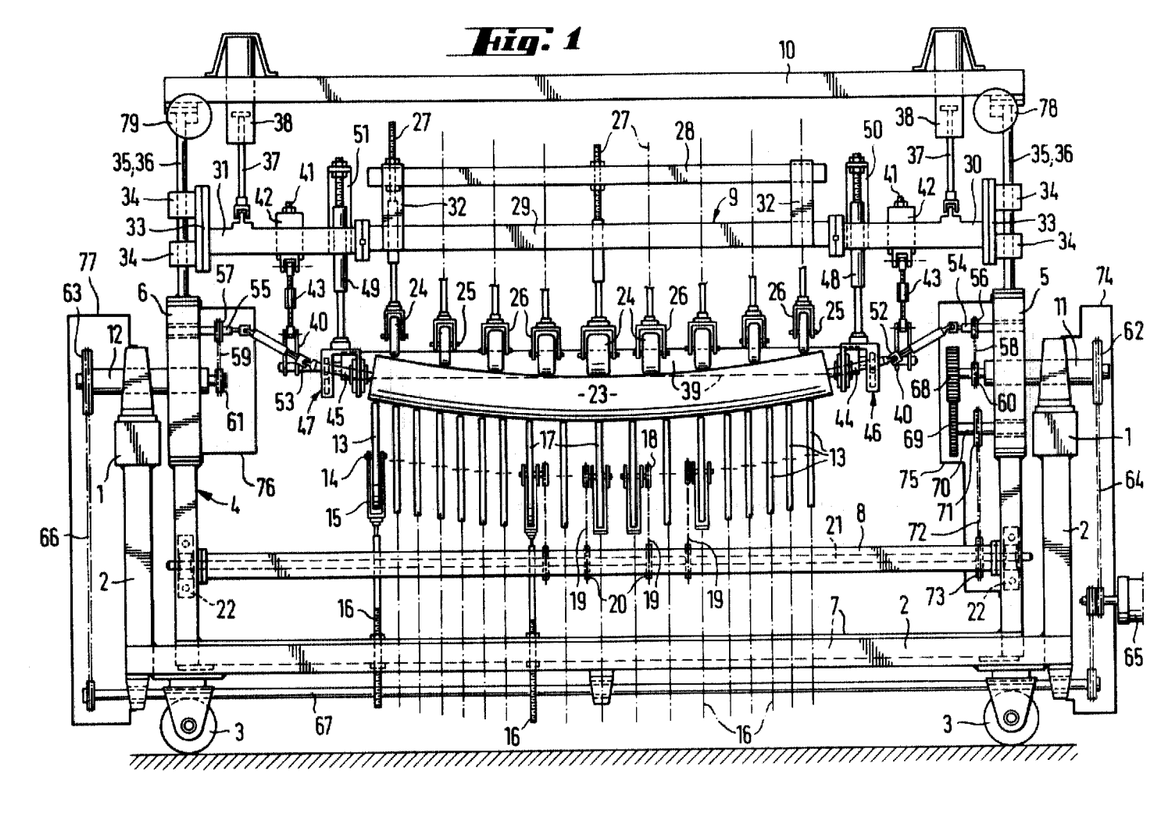
FIG. 1 is a front elevation view of an apparatus in accordance with the invention for the manufacture of laminated glazings.
Figure 2:
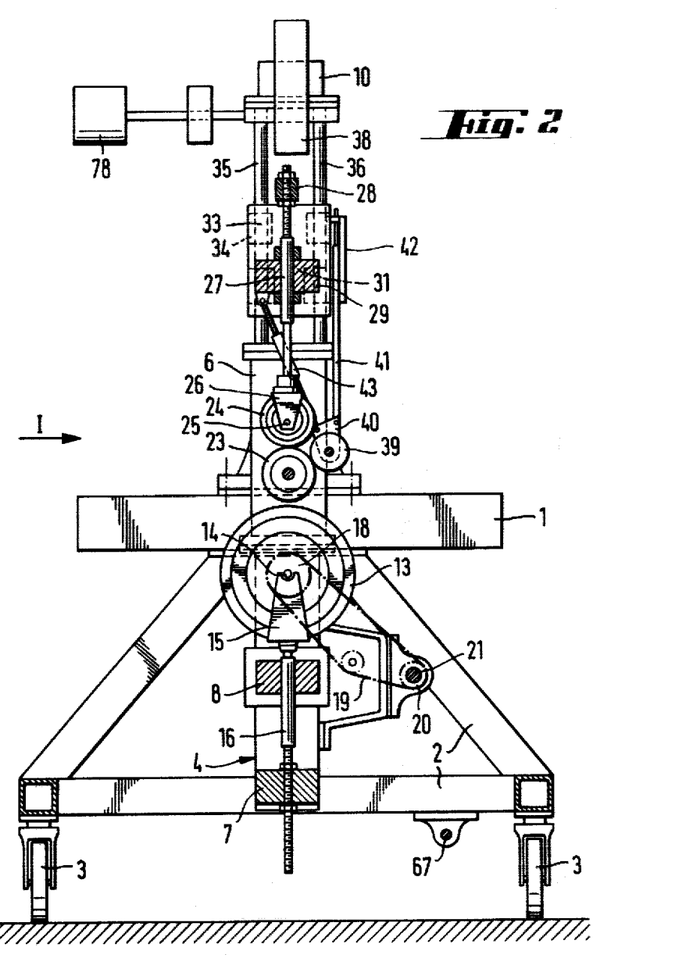
FIG. 2 is a vertical sectional view of the apparatus of FIG. 1.

As shown in FIGS. 1 and 2, the apparatus comprises a support frame 1, formed by various sections assembled by welding, and of which the base portion 2, larger so as to obtain a rigid support of the unit, rests on casters 3 which facilitates, if need be, the relocation of the apparatus.

A pivotable frame 4 made of two vertical uprights 5 and 6 and of four horizontal beams 7, 8, 9 and 10, is mounted on two half-shafts 11, 12 borne by the support frame 1 and in turn supports the various elements for effecting the assembly and pressing operation. A plurality of lower wheels 13 are mounted on axes 14 supported by forks 15 extending from threaded rods 16 which, screwed into the lower beam 7 and supported by beam 8, regulate the height of the wheels and their placement with regard to one another so that their upper surfaces cumulatively assume a curvature substantially identical to the average transverse curvature of the lower surface of the glazing to be manufactured. The apparatus comprises about twenty lower wheels, each having a diameter of about 25 centimeters. Several of these wheels 17 are connected to gears 18 linked by chains 19 to cogwheels 20 of a horizontal rotating shaft 21 displaced toward the back part of the apparatus with regard to the horizontal beam 8. The rotating shaft 21 is itself supported by bearings 22 fixed to the frame 4. The other lower wheels 13 are freely rotatable on their axes 14.

The metallic core of each lower wheel is covered on its periphery with at least one layer of a flexible and wear resistant material, such as vulcanized rubber.

A cylindrical pressure roller 23 is mounted above the upper surfaces of the lower wheels. The pressure roller 23 has a diameter of about 10 centimeters and is preferably made of vulcanized rubber with inner and outer layers, for example an outer layer of Shore hardness of 70 and of an inner layer of Shore hardness of 40 forming the core of the roller. The pressure roller 23 is deflected into a curved configuration conforming to the upper surface of the glazing assembly by the action of a series of upper or roller bending wheels 24. These wheels are mounted for free rotation on axes 25 supported by forks 26 extending from the threaded rods 27 screwed into an upper horizontal brace 28 and passing through the center part 29 of the beam 9 formed by three parts. This center part 29 is parallel to the upper horizontal brace 28 and slightly displaced about 15 millimeters upstream (to the left in FIGS. 2 and 4) with regard to the two end parts 30 and 31 of the beam 9, therefore also with regard to the plane of the pivoting frame. The threaded vertical rods 27 may be adjusted to regulate the height of the roller bending wheels 24 and accordingly their deflection of the pressure roller 23, since the wheels bear upon its upper upstream portion.

The roller bending wheels 24, numbering around 10 and having a diameter of about 10 centimeters, are made of steel and covered on their periphery with at least one layer of flexible and wear resistant material, such as rubber.

In the illustrated embodiment the wheels 24 are vertical and their width varies according to their position above the roller, the wheels at the center being wider than those at the extremities. This is justified by the fact that the acting part of the wheels, given the curvature of the roller, is narrower at the edges of the roller than at its center. Therefore the distance between the wheels varies according to their location. These wheels preferably have rounded edges.

The wheels 24 can also be mounted on a more or less inclined plane with regard to the plane of symmetry of the apparatus, as a function of their position and of the curvature to be given to the roller, so that their action on the roller is perpendicular to its axis.

The cylindrical pressure roller can have a length of 1 meter and more as required by the dimensions of the glazing to be manufactured. To avoid potential edge effects due to its means of support and rotational drive, it should exceed the boundaries of the glazing by at least 10 centimeters on each side.

To increase the flexibility of the pinching elements of the apparatus with respect to the curvature change of a given glazing, a flexible spring-loaded mounting system, not shown, can be mounted on the rods of the upper running wheels and/or on that of the lower running wheels. For example, calibrated springs can be mounted on the rods of the running wheels between the small beam part 29 of the beam 9 and also between the two beams 7 and 8.

The upper horizontal beam 28 is supported by the intermediary plates 32 above the center part 29 of the horizontal beam 9. This beam 9 is fixed on each side to a plate 33 bearing four rings 34 sliding around two cylindrical rods 35 and 36 forming the upper part of each of the two uprights of the pivotable frame 4. Beam 9 is connected to the piston rods 37 of two vertical piston-cylinder assemblies 38 of which the cylinders are fixed to the upper horizontal beam 10 of the frame. These two cylinders 38 enable the lifting of the upper part of the pressing unit, that is to say, the pressure roller 23, the upper running wheels 24 and a support roller 39 described herebelow, and by so doing to create a space between the pressure roller and the lower running wheels.

In this way, one can intervene easily and rapidly to free, if need be, a misdirected or defective glazing which could become jammed between the pressure roller and the lower running wheels, all while avoiding the need to raise the upper running wheels and by that to deregulate the curvature of the roller in its operational position. The raising also facilitates the initial regulating of the position of the lower running wheels.

Preferably, the cylinders 38 are of the hydropneumatic type, the movement of which can be accurately controlled.

A support roller 39 is mounted at each of its extremities on a hinge 40 connected on one side to a vertical holding rod 41 attached to a right-angled brace 42 on the beam 9. The hinge 40 is connected on the other side to an inclined rod 43 formed by two halfrods with reversed thread channels, connected by a threaded ring suitable for bringing them closer together or farther apart, therefore changing the length of the inclined rod 43. This type of mounting of the support roller enables the regulation of its height and position with regard to the pressure roller as well as its pressure against the roller. The support roller is applied against the upper part of the pressure roller on the downstream side thereof.

The pressure roller is rotatably supported at its extremities by rotating half-shafts 44 and 45 mounted on forks 46 and 47 having double oscillating and sliding ball bearings. The forks are supported and regulated in height by threaded rods 48 and 49 screwed to right-angled braces 50 and 51 attached to the horizontal beam 9. The mounting on double ball bearings (this mounting will be described in detail herebelow with reference to FIG. 3) gives great freedom of movement to the roller and in no way hinders its action on the glazing.

The two half-shafts 44 and 45 are respectively connected by homokinetic joints 52 and 53 to two horizontal half-shafts 54 and 55 mounted on the uprights 5 and 6 of the frame 4. Borne by the two horizontal half-shafts 54 and 55, two cogwheels 56 and 57 are connected by chains 58 and 59 to two other cogwheels 60 and 61, carried by axes concentric with the pivoting half-axes 11 and 12 of the frame 4.

The extremities of these outermost half-axes 11 and 12 of the apparatus bear cogwheels 62 and 63 connected to a motor apparatus 65, one by a chain 64 and the other by a chain 66 and a shaft 67. The other extremity of the half-axis 11 bears a first gear wheel 68 connected to a second gear wheel 69 integral to a half-shaft 70 borne by the upright 5. A cogwheel 71 is mounted on this half-shaft 70. This cogwheel is connected by a chain 72 to a cogwheel 73 connected to the shaft 21 driving the lower motorized wheels 17. The cogwheels and chains of the transmission system are protected by housings 74, 75, 76 and 77.

The present apparatus also provides two counter-weight systems 78 and 79 which facilitate the pivoting of the frame around the half-axes 11 and 12 as described below.

Figure 3:
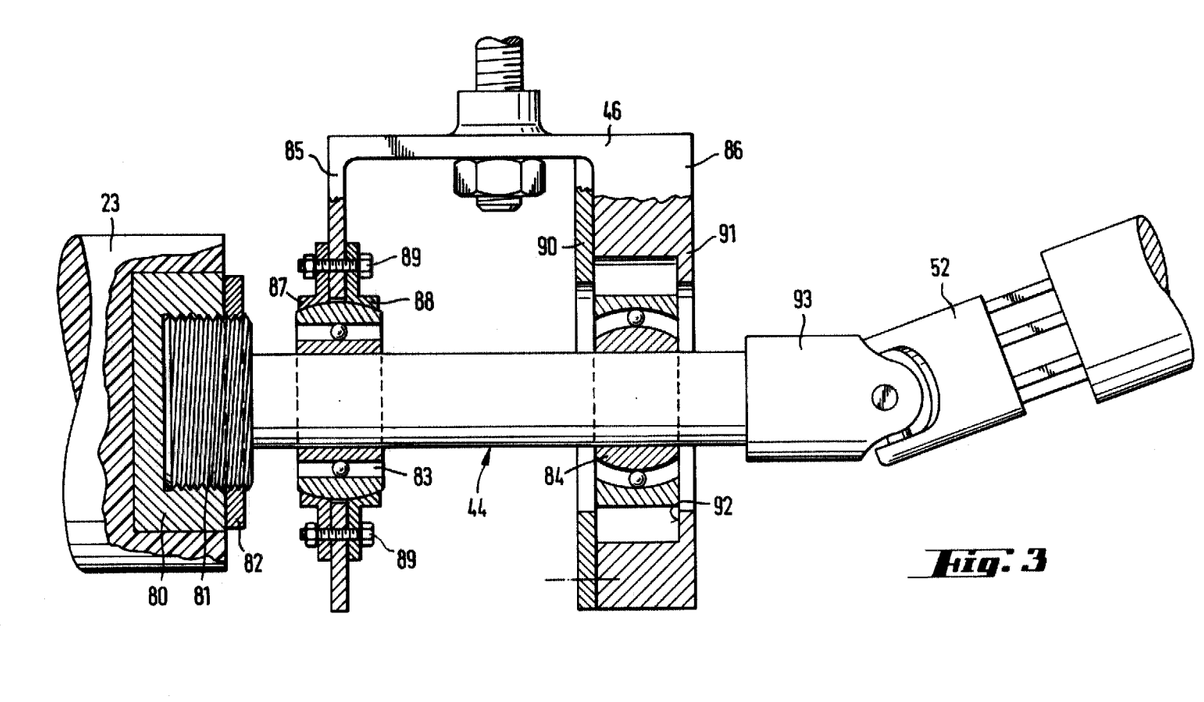
FIG. 3 is an enlarged detail view, partly in section showing the mounting arrangement of one end of the pressure roller.

FIG. 3 represents the mounting of the pressure roller 23 at one of its extremities on the half-shaft 44. The extremity of the rubber roller 23, previously bored out, contains a threaded ring 80 into which the extremity 81 of the half-shaft 44 is screwed. This threaded connection is secured by a lock nut 82. The half-shaft 44 is mounted in two spherical ball bearings 83 and 84 enabling an oscillating movement of the half-shaft with regard to the two arms 85 and 86 of the fork 46 which supports the ball bearings. Two rings 87 and 88 fixed by screws 89 to the arm 85 maintains the position of the bearing 83. The arm 86 is formed from two bored out parts 90 and 91 which, when they are assembled, form a vertical guide in which the oscillating ball bearing 84 can slide freely. The outer end 93 of the half-shaft 44 is connected to the half-shaft 54, not shown, by homokinetic joint 52 comprising a double universal joint of which only part is shown in FIG. 3.

Figure 4:
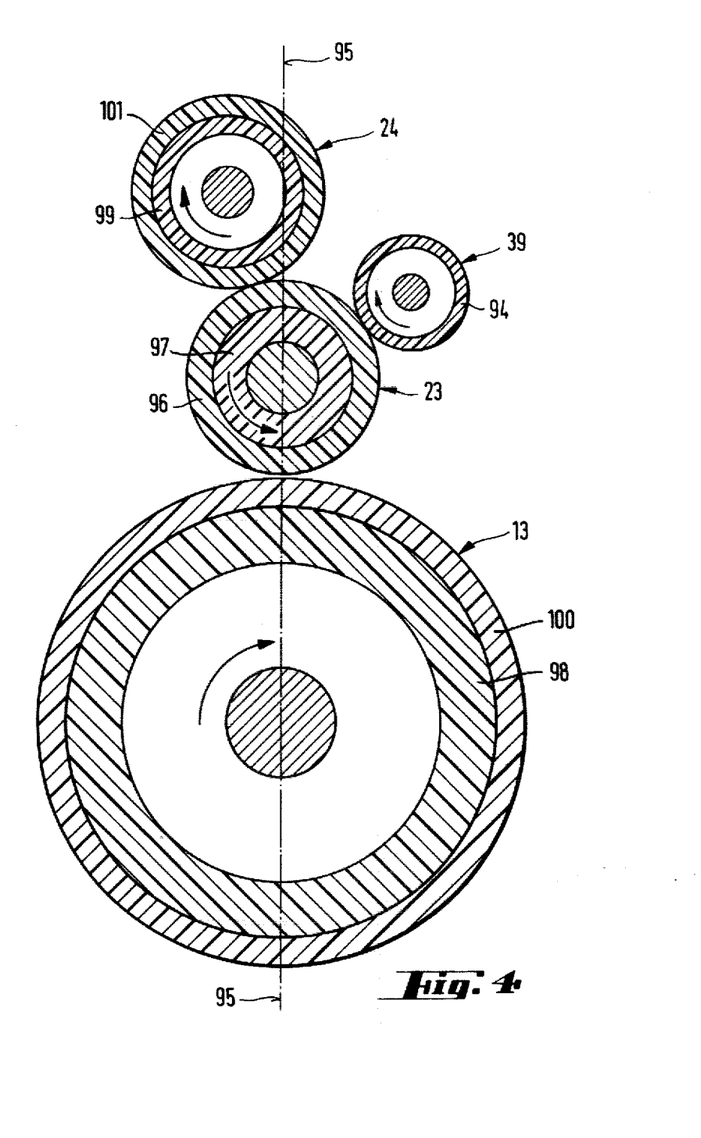
FIG. 4 is an enlarged schematic transverse sectional view of the pressure roller, supporting roller and the roller bending and lower wheels.

FIG. 4 shows in a cross-sectional view the position of the principal elements involved in the pressing of the laminated glazing.

Regardless of the degree of curvature of the pressure roller 23 produced by the roller bending wheels 24, the pressure roller 23 is disposed in a vertical plane 95 (FIG. 4) passing through the axes of the lower wheels 13. The wheels 24 bear against the pressure roller slightly upstream, for example about 15 mm. off the vertical plane 95, while the support roller 39 bears against an upper downstream portion of the pressure roller. Due to this arrangement, the pressure roller, or at least its two extremities, cannot move longitudinally during calendering.

The cylindrical pressure roller shown is made of two layers of vulcanized rubber: for example an outer layer 96, being 20 millimeters thick and of Shore hardness 70, and a softer inner layer 97, of Shore hardness 40 for example which forms the core of the roller. This structure provides a great flexibility of the roller and enables it to bear constantly on the upper element to be assembled with the rigid substrate in order to make the glazing, while conforming to all or most of the changes of the transverse curvature of the glazing.

To increase this ability to adapt to the variations of curvature of a given glazing, the lower wheels, as well as the roller bending wheels, can be mounted on a resilient spring-loaded mounting system. They can also have a peripheral structure with two layers of rubber of different hardnesses. Thus their steel core can be covered on its periphery by an inner layer 98 and 99 respectively, of about 20 millimeters thick, made of a sufficiently soft rubber, and by a second outer layer, 100 and 101 respectively, of about 20 millimeters thick, made of harder rubber which is more resistant to wear. The steel support roller 39 is also covered with a layer of rubber 94.

Figure 5:
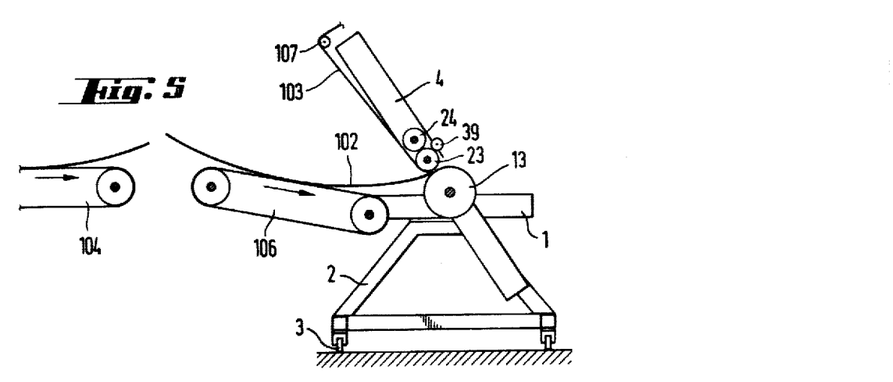
FIGS. 5, 6 and 7 are schematic side elevational views showing successive phases of an assembly and pressing operation.
Figure 6:
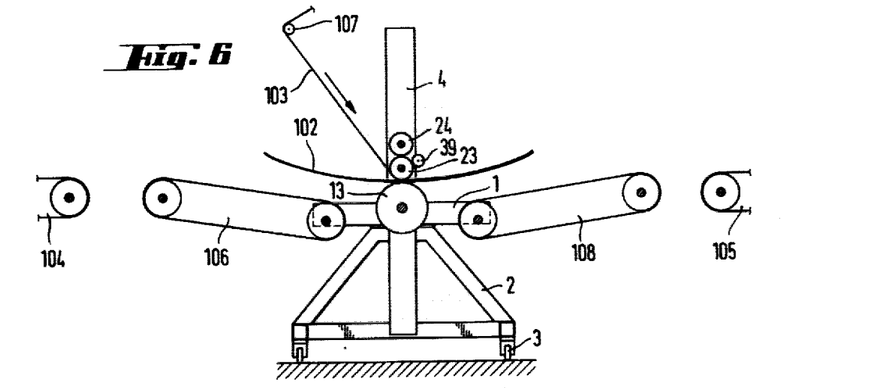
Figure 7:
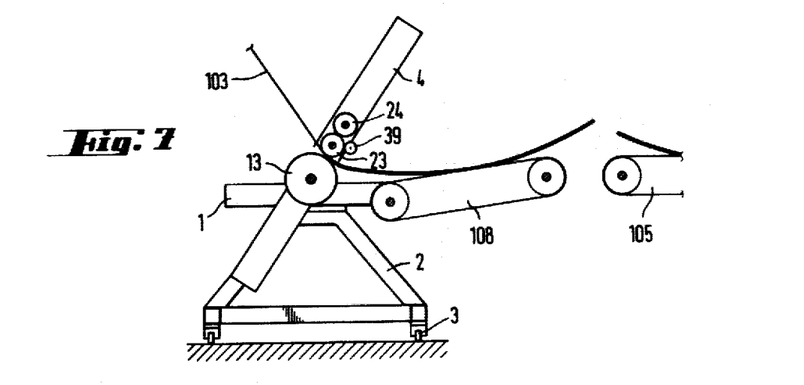

The operation of the apparatus is described hereafter with reference to FIGS. 5, 6 and 7 and with respect to the manufacture by calendering of a double-curvature safety glazing, comprising a monolithic or laminated rigid substrate 102 made of glass and/or plastic material which is covered with a sheet of flexible plastic material 103. For example, a sheet such as the one described in Belgian Pat. No. 856,398, already cited, is utilized, made essentially of a layer of thermosetting polyurethane presenting anti-lacerative and self-heating properties and of a layer of a thermoplastic polymer having adhesive properties with the substrate to be covered.

In FIGS. 5, 6 and 7 the apparatus is shown in an assembly line, placed between an upstream conveyor 104, with rollers or belts which carry the substrate to be covered, and a downstream conveyor 105 which receives and removes the covered substrated. The final section 106 of the upstream conveyor is inclined with regard to the horizontal plane so as to lead the edge of the substrate to be covered perpendicularly to the common plane of the lower wheels and the pressure roller (that is to say perpendicularly to the pinching plane) without it being necessary to greatly incline the pivoting frame which carries these elements.

The sheet of plastic material which must cover the substrate is part of a strip of indefinite length. It is lead from above the apparatus while being constantly kept taut by an upper tension roller 107.

The position of the lower wheels is regulated with the threaded rods to give the unit the desired curvature which is generally the average transverse curvature of the glazing. An identical curvature is given to the pressure roller by bending it with the roller bending wheels, the position of which is regulated by means of their threaded rods. The distance from the pressure roller to the lower wheels being slightly less than the thickness of the glazing to be manufactured, or even null, the pressure roller then being in contact with the lower wheels, the support roller is adjusted so that it exercises its action on the pressure roller.

The motor apparatus is activated and the pressure roller and the lower motorized wheels are driven in a rotational movement, at the linear speed of about 3 meters per minute or more, if need be. This speed may vary during the passage of a given assembly, as a function of the sequence: approach of the glazing, the actual assembly, etc. The roller bending wheels and the support roller are driven in rotation by the pressure roller. The rotational direction is that of the arrows shown in FIG. 4.

When the substrate 102 to be covered arrives on the inclined, upstream conveyor 106, the balanced frame 4, which carries in particular the pressing elements, is manually or automatically pivoted in order to incline the upper part of the frame upstream.

The edge of the substrate to be covered is presented perpendicularly to the pinching plane. In contact with the lower motorized wheels, this substrate is entrained between these running wheels and the pressure roller which, itself, entrains the sheet of plastic materials and presses it at all points onto the substrate. As the substrate advances between the pressure roller and lower motorized and freely moving wheels, these latter entrained in rotation by the bottom side of the substrate, and as the sheet of plastic materials covers the latter, the frame 4 pivots around the two horizontal half-axes 11 and 12 to reach the vertical position at the time when the assembly is half finished; then it is inclined with its upper portion leaning toward the downstream conveyor, on the inclined section 108 of which the substrate covered with the sheet of the plastic material is deposited.

During the calendering operation, the pressure roller exerts the required pressing force on the glazing which can be relatively equal at all points. This force can be adjusted through a wide range according to the glazing manufactured and can vary, for example, from one to several hundreds of newtons per linear centimeter. Although the pressure roller and the lower running wheels are initially regulated to the average transverse curvature of the glazing, the great flexibility of the pressure roller, associated if need be to that of the damping devices on which the upper and roller bending wheels can be mounted, enables the absorption of the possible variations in the transverse curvature encountered during the movement of the glazing.

When the glazing assembly emerges from the apparatus, the sheet of plastic material is perfectly applied to the substrate and no bubbles appear between the two.

The adherence obtained is generally improved for an automobile windshield by submitting the glazing to an autoclave cycle, for example at 120° C. under a pressure of 10 bars for one hour.

If need be, in order to increase the adhesion produced during calendering, the sheet is heated before assembly to a temperature of about 60° C. so as to activate the adhesive layer. This heating can be done with an additional apparatus such as infrared tubes placed opposite the sheet. The substrate can also be heated beforehand.

When the assembly is completed, the edges of the sheet of plastic material are cut to correspond to the shape of the glazing by known means such as a heated knife.

The degree to which the pressure roller deforms in the direction of the displacement of the glazing is dependent upon the extent of contact with and hence the support provided by the supporting roll which is a function of the amount of curvature given the pressure roll.

All sorts of laminated safety glazing may thus be manufactured, of very diverse sizes and curvatures, particularly for motor vehicle windshields, and the manufacture may be carried out at a rapid rate. For example, about two hundred glazings and more can be manufactured in an hour.

The apparatus can also be advantageously utilized for the manufacture of lenses or other assemblages of elements for which the curvatures of the two opposite sides are different. It suffices to regulate the pressure roller to the curvature of the top side of the laminate to be obtained, and the lower pinching means such as the lower wheels, to the curvature of the bottom side of the laminate.

The great flexibility of the apparatus permits its use, if need be, to assemble various types of glazings having different curvatures and thicknesses, without it being necessary to readjust the respective positions of the pinching means. It is in such cases important that the said pinching means are adjusted to correspond to the most accentuated curvature so that the extremities of the lower pinching means, for example the lower wheels placed at the extremities, always support the glazing.

We claim:

1. An apparatus for the manufacture of laminated glazings, comprising:
 lower pinching means having a curvature corresponding to the curvature of the lower surface of the glazing to be assembled considered transversely to its direction of displacement, upper pinching means comprising a flexible cylindrical pressure roller disposed above the lower pinching means, said upper and lower pinching means being at least equal to the width of the elements to be assembled, means bearing on the upper outer periphery of said pressure roller to give it a curvature corresponding to the curvature of the upper surface of the glazing to be assembled considered transversely to its direction of displacement, and to maintain said pressure roller in its curved operational position, said means bearing on the upper outer periphery of said pressure roller comprising a series of wheels placed side by side, and drive means for rotating at least one of said pinching means.

2. An apparatus in accordance with claim 1, characterized in that said means bearing on said pressure roller give it a curvature practically identical to that of the lower pinching means.

3. An apparatus in accordance with claim 1 characterized in that the lower pinching means are formed by a series of wheels, placed side by side, following the desired curvature.

4. An apparatus in accordance with claim 1, characterized in that said means bearing on the upper outer periphery of said pressure roller in order to curve it are formed by individually adjustable wheels placed side by side, each of said wheels being adjustable toward or away from said pressure roller to permit selective control of the deflection of said pressure roller.

5. An apparatus in accordance with claim 1, characterized in that said means bearing against the periphery said pressure roller includes means bearing against the upstream side of said pressure roller, and supplementary means bearing against the downstream side of said pressure roller.

6. An apparatus in accordance with claim 5, characterized in that said supplementary means bearing against the downstream side of said pressure roller comprises a support roller extending a length at least equal to that of the pressure roller.

7. An apparatus in accordance with claim 1, characterized in that said flexible pressure roller is made of vulcanized rubber.

8. An apparatus in accordance with claim 7, characterized in that the diameter of said pressure roller is less than about 20 centimeters.

9. An apparatus in accordance with claim 7, characterized in that said flexible pressure roller is made of at least two layers of vulcanized rubber of different hardnesses.

10. An apparatus in accordance with claim 7, characterized in that said flexible pressure roller is made of three layers of vulcanized rubber: a hard outer layer, a soft intermediate layer, and a hard inner layer.

11. An apparatus in accordance with claim 1, characterized in that said pressure roller is supported at each of its extremities by a half-shaft mounted in a pair of spaced ball bearings, one of said bearings being mounted for oscillating movement.

12. An apparatus in accordance with claim 1, characterized in that said lower pinching means comprises a plurality of rotatably supported spaced wheels of substantially the same diameter.

13. An apparatus in accordance with claim 12, comprising drive means for rotating at least some of said wheels.

14. An apparatus in accordance with claim 12, characterized in that said lower pinching means wheels have at least one flexible outer layer, such as vulcanized rubber.

15. An apparatus in accordance with claim 14, characterized in that said lower pinching means wheels have a hard outer layer of vulcanized rubber and a soft inner layer.

16. An apparatus in accordance with claim 12, characterized in that said lower pinching means wheels are adjustably mounted.

17. An apparatus in accordance with claim 5, characterized in that said wheels each comprise a flexible layer.

18. An apparatus in accordance with claim 17, characterized in that said roller bending wheels have a hard outer layer made of vulcanized rubber and a soft inner layer.

19. An apparatus in accordance with claim 17, characterized in that said roller bending wheels are mounted on a spring movement and flexible return system.

20. An apparatus in accordance with claim 17, characterized in that said roller bending wheels have larger widths at the center of the pressure roller than at its extremities.

21. An apparatus in accordance with claim 17, characterized in that said roller bending wheels have rounded edges.

22. An apparatus in accordance with claim 1, characterized in that said pressure roller is driven by a drive system comprising double universal joints.

23. An apparatus in accordance with claim 1, characterized in that said upper and lower pinching means are mounted on a frame pivotable around a horizontal axis.

24. An apparatus in accordance with claim 1, comprising means enabling the pressure roller and the elements bearing on it to be separated from the lower pinching means as a unit without disturbing the curvature of the pressure roller.

25. An apparatus in accordance with claim 24, characterized in that the means enabling the pressure rollers and the elements bearing on it to be separated from the lower pinching means comprises hydropneumatic cylinders.

26. An apparatus in accordance with claim 3, characterized in that some of said wheels are driven in rotation by said drive means, and means permitting free rotation of said driven wheels to conform to the speed of the glazing passing thereover.

* * * * *